US007801153B2

(12) United States Patent
Anderson et al.

(10) Patent No.: US 7,801,153 B2
(45) Date of Patent: Sep. 21, 2010

(54) COMMUNICATION SCHEDULING OF NETWORK NODES USING FAIR ACCESS AND WEIGHTING TECHNIQUES

(75) Inventors: Arthur E. Anderson, Placentia, CA (US); Wendell Y. Kishaba, San Diego, CA (US); Timothy J. Hughes, San Diego, CA (US)

(73) Assignee: Powerwave Cognition, Inc., Santa Ana, CA (US)

( * ) Notice: Subject to any disclaimer, the term of this patent is extended or adjusted under 35 U.S.C. 154(b) by 68 days.

(21) Appl. No.: 11/947,928

(22) Filed: Nov. 30, 2007

(65) Prior Publication Data

US 2009/0086752 A1    Apr. 2, 2009

Related U.S. Application Data

(60) Provisional application No. 60/976,730, filed on Oct. 1, 2007.

(51) Int. Cl.
  *H04L 12/56*    (2006.01)
(52) U.S. Cl. .................................... 370/395.4
(58) Field of Classification Search ........................ None
  See application file for complete search history.

(56) References Cited

U.S. PATENT DOCUMENTS

| | | | |
|---|---|---|---|
| 6,757,263 | B1 | 6/2004 | Olds |
| 7,062,687 | B1 | 6/2006 | Gfeller |
| 2003/0202469 | A1 | 10/2003 | Cain |
| 2003/0231588 | A1* | 12/2003 | Roth et al. .................. 370/230 |
| 2005/0053005 | A1 | 3/2005 | Cain et al. |
| 2005/0083848 | A1 | 4/2005 | Shao et al. |
| 2006/0268879 | A1 | 11/2006 | Xhafa et al. |

(Continued)

FOREIGN PATENT DOCUMENTS

KR    20020055285    7/2002

(Continued)

OTHER PUBLICATIONS

Notification of Transmittal of the International Search Report and the Written Opinion of the International Searching Authority, or the Declaration, PCT/US2008/077331 dated Jan. 28, 2009.

(Continued)

*Primary Examiner*—Chirag G Shah
*Assistant Examiner*—Amarnauth Persaud
(74) *Attorney, Agent, or Firm*—Strategic Patents, P.C.

(57) ABSTRACT

In one aspect, a method to schedule network communications in a network having nodes connected by links includes sending a bandwidth value of a first node for each link connected to the first node to neighbors of the first node, receiving bandwidth values from the neighbors of the first node; and determining node weight values of the first node and the neighbors of the first node based on the bandwidth values received from the neighbors of the first node and the bandwidth value of the first node. The method also includes sending the node weight values of the first node to the neighbors of the first node, receiving the node weight values from the neighbors of the first node, determining access values for each node based on a fair access technique and determining network scheduling based on the access values and the node weight values.

22 Claims, 5 Drawing Sheets

U.S. PATENT DOCUMENTS

| | | | |
|---|---|---|---|
| 2007/0104177 A1* | 5/2007 | Hwang et al. | 370/348 |
| 2007/0195817 A1* | 8/2007 | Denney et al. | 370/468 |
| 2008/0198815 A1* | 8/2008 | Liu | 370/336 |
| 2009/0054073 A1* | 2/2009 | Roy et al. | 455/450 |
| 2009/0116511 A1 | 5/2009 | Anderson et al. | |

FOREIGN PATENT DOCUMENTS

| | | |
|---|---|---|
| WO | WO0128170 | 4/2001 |
| WO | WO 01/28170 A | 1/2002 |
| WO | WO-03/090083 A1 | 10/2003 |
| WO | WO-2009/046143 A2 | 4/2009 |
| WO | WO-2009/046143 A3 | 4/2009 |

OTHER PUBLICATIONS

"International Search Report", ISR of Jan. 28, 2009 for PCT Application No. PCT/US2008/077331.

Vaidya, Nitin et al., "Distributed Fair Scheduling in a 1-25, 66-85", *IEEE Trans. on Mobile Computing*, vol. 4, No. 6, ,, (Nov. 2005),pp. 616-629.

Shiann-Tsong, S. et al., "A Bandwidth AllocationiSharinglExtension Protocol 26-45", *IEEE Journal on Selected Areas in Communications*, vol. 19, No. 10, ,, (Oct. 2001),pp. 2065-2080.

Qi, Xue et al., ""Ad hoc QoS on-demand routing (AQOR) in mobile ad hoc networks,"", *Journal of Parallel and Distributed Computing,*, (2003),pp. 154-165.

ISR, "International Search Report", PCT/US2008078501, (Apr. 28, 2009),all.

Sung Park, et al., "Network Communication Scheduling", U.S. Appl. No. 11/678,668, filed Feb. 26, 2007.

Lichun Bao, et. al., "Channel Access Scheduling in Ad Hoc Networks with Unidirectional Links", Computer Science Dept. and Computer Engineering Dept., University of CA, 2001.

Sung Park, et al., "Communication Scheduling of Network Nodes", U.S. Appl. No. 11/842,998, filed Aug. 22, 2007.

Daniel L. Cormier, et al., "Determining a Mode to Transmit Data", U.S. Appl. No. 11/548,763, filed Oct. 12, 2006.

Lichun Bao, et. al., "Hybrid Channel Access Scheduling in Ad Hoc Networks", Computer Science Dept. and Computer Engineering Dept., University of CA, 2002.

"U.S. Appl. No. 12/242,462, Non-Final Office Action mailed Feb. 2, 2010", , 12.

* cited by examiner

|  | Timeslot 1 | Timeslot 2 | Timeslot 3 | Timeslot 4 |
|---|---|---|---|---|
| Node 12a | Receive | Receive | Receive | Transmit |
| Node 12b | Transmit | Receive | Receive | Receive |
| Node 12c | Receive | Receive | Transmit | Receive |
| Node 12d | Receive | Transmit | Receive | Receive |

Total_current = current summation of 3 queue types
    Total_prev = previous sec. summation of 3 queue types
    Last_Max_Q_Size = the max queue size for this neighbor recorded
    in the previous second
    DECREMENT_THRESH = 5 packets

```
If (Total_current == Total_prev)
{
        if (Total_current ! = 0)
        {
                Increase BW_out by 3;
                (Max BW value cannot be greater than 7)
        }
else
{
        if (Last_Max_Q_Size < 30 packets)
                Decrease BW_out by 1;
(Min BW value cannot be less than 1)
}
}
else if (Total_current > Total_previous)
{
        Increase BW_out by 3;
        (Max BW value cannot be greater than 7)
}
else if (Total_current < Total_previous)
{
        if ((Total_current - Total_prev) > DECREMENT_THRESH)
        {
        if (Last_Max_Q_Size < 30 packets)
                Decrease BW_out by 1;
(Min BW value cannot be less than 1)
}
else
{
        BW_out stays the same.
}

COMMUNICATION SCHEDULING OF NETWORK NODES USING FAIR ACCESS AND WEIGHTING TECHNIQUES

RELATED APPLICATIONS

This patent application claims priority to Application Ser. No. 60/976,730, filed Oct. 1, 2007 entitled "A METHOD FOR INCREASING THE SUCCESSFUL OUTCOMES OF A FAIR COIN FLIP USING A NODE WEIGHT METRIC IN A COMMUNICATION SYSTEM."

GOVERNMENT SPONSORED RESEARCH

This invention was made with support of the United States Government under Contract MDA972-01-9-0022. The United States Government may have certain rights in the invention.

BACKGROUND

In a shared network with multiple users sharing the same frequency, it is desirable to have only one user transmit data at a time. For example, if one user transmits data at the same time another user is transmitting data, collisions occur and data is generally corrupted and lost. One method to reduce collisions in the shared networks is to use time division multiple access (TDMA). TDMA enables several users to share the same frequency by dividing the use of the shared frequency into different timeslots, one user per timeslot. For example, the users transmit data in succession (i.e., one user transmits data after another user transmits data), each user using its own timeslot so that only one user transmits data during a timeslot.

SUMMARY

In one aspect, a method to schedule network communications in a network having nodes connected by links includes sending a bandwidth value of a first node for each link connected to the first node to neighbors of the first node, receiving bandwidth values from the neighbors of the first node; and determining node weight values of the first node and the neighbors of the first node based on the bandwidth values received from the neighbors of the first node and the bandwidth value of the first node. The method also includes sending the node weight values of the first node to the neighbors of the first node, receiving the node weight values from the neighbors of the first node, determining access values for each node based on a fair access technique and determining network scheduling based on the access values and the node weight values.

In another aspect, an apparatus, to schedule communications in a network having nodes connected by links, includes circuitry to send a bandwidth value of a first node for each link connected to the first node to neighbors of the first node, receive bandwidth values from the neighbors of the first node, determine node weight values of the first node and the neighbors of the first node based on the bandwidth values received from the neighbors of the first node and the bandwidth value of the first node and send the node weight values of the first node to the neighbors of the first node. The apparatus also includes circuitry to receive the node weight values from the neighbors of the first node, determine access values for each node based on a fair access technique and determine network scheduling based on the access values and the node weight values.

In a further aspect, an article includes a machine-readable medium that stores executable instructions to schedule communications in a network having nodes connected by links. The instructions cause a machine to send a bandwidth value of a first node for each link connected to the first node to neighbors of the first node, receive bandwidth values from the neighbors of the first node, determine node weight values of the first node and the neighbors of the first node based on the bandwidth values received from the neighbors of the first node and the bandwidth value of the first node and send the node weight values of the first node to the neighbors of the first node. The instructions also include instructions causing a machine to receive the node weight values from the neighbors of the first node, determine access values for each node based on a fair access technique and determine network scheduling based on the access values and the node weight values.

DESCRIPTION OF THE DRAWINGS

FIG. 4 is an example of pseudocode used to determine a bandwidth value.

DETAILED DESCRIPTION

Described herein is an approach to schedule network communications using a fair access technique combined with a weighting technique based on channel bandwidth. The approach described herein allows a decision process of determining which node transmits to be made in a distributed environment without the need for a centralized protocol. The approach also provides access to transmit on a channel based on need rather than on earlier requests for channel access, for example. Moreover, the approach adapts to changing channel conditions.

While the fair access technique described herein uses a Node Activation Multiple Access (NAMA) technique, any fair access technique may be used, for example, a Resource Oriented Multiple Access (ROMA). Also, while the channels described herein are time slots within a TDMA, the techniques described herein are not limited to TDMA.

Figures 1, 2:
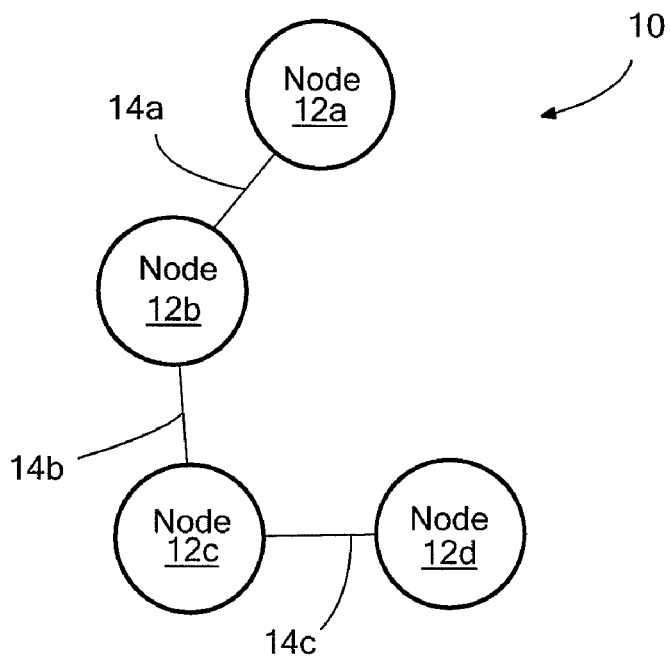
FIG. 1 is a diagram of a communication network having nodes.
FIG. 2 is a network schedule based on a fair access technique.

Referring to FIG. 1, a communications network 10 includes nodes (e.g., a first node 12a, a second node 12b, a third node 12c and a fourth node 12d). In one example, the nodes 12a-12d are network routers. In another example, the nodes 12a-12d are wireless radios. The nodes 12a-12d are connected by links representing that the two nodes are within transmit/receive range of each other (e.g., a first link 14a connecting the first node 12a to the second node 12b, a second link 14b connecting the second node 12b to the third node 12c and a third link 14c connecting the third node 12c to the fourth node 12d).

In one example, the links 14a-14c are wireless links. In another example, the links 14a-14c are wired links. In another example, links 14a-14c may be a combination of wireless and wired links. The communications network 10 may be any shared medium. The links 14a-14c may include one or more channels.

The first node 12a and the second node 12b are one hop away from each other (i.e., one-hop neighbors). One hop means that the shortest network path from the first node 12a to the second node 12b does not include any intervening nodes (i.e., one link). Likewise the second node 12b and the third node 12c and the third node 12c and the fourth node 12d are all one-hop neighbors to each other.

The first node 12a and the third node 12c are two hops away from each other (i.e., two-hop neighbors). Two hops means that the shortest network path from the first node 12a to the third node 12c includes only one intervening node (the second node 12b) (i.e., two links). Likewise the second node 12b and the fourth node 12d are two-hop neighbors to each other.

A goal of network communications scheduling is to ensure that only one network node communicates at a time. For example, in a wireless network, if one node transmits data at the same time another node is transmitting data, collisions, which corrupt the data, will occur at a receiving node which is in wireless range of both transmitting nodes. One way used in the prior art to reduce collisions is to use time division multiplexing access (TDMA). One particular implementation of TDMA uses a Node Activation Multiple Access (NAMA) technique. NAMA is a wireless multiple access protocol designed to generate dynamic and collision-free TDMA timeslot scheduling. NAMA achieves collision-free TDMA timeslot scheduling by having nodes within one and two hops of each other, for example, participate in a cooperative random election process. Each node performs the same random election process to determine simultaneously which node transmits data for a particular timeslot.

For example, referring back to FIG. 1, the nodes 12a-12d implement an election process for four timeslots (e.g., timeslot 1, timeslot 2, timeslot 3 and timeslot 4). During each timeslot, each node 12a-12d in the network 10 determines a set of pseudo-random numbers based on each node's ID for those nodes that are within one or two hops distance. The assumption is that each node is aware of all other nodes (e.g., has the node ID of the other nodes) within a two-hop neighborhood. Since each node is using the same pseudo random number generation function to determine the random numbers, each node will come up with a consistent random value for each of the nodes within the two-hop neighborhood. Once a set of values is determined, the node with the highest value in a particular timeslot transmits during that timeslot.

In one particular example of determining random values, in timeslot 1, the first node 12a is determined to have a value of 4, the second node 12b is determined to have a value of 8, the third node 12c is determined to have a value of 1 and the fourth node 12d is determined to have a value of 7. Since the second node 12b has the highest value, the second node is the only node that transmits during timeslot 1.

In timeslot 2, the first node 12a is determined to have a value of 3, the second node 12b is determined to have a value of 5, the third node 12c is determined to have a value of 4 and the fourth node 12d is determined to have a value of 9. Since the fourth node 12d has the highest value, the fourth node is the only node that transmits during timeslot 2.

In timeslot 3, the first node 12a is determined to have a value of 2, the second node 12b is determined to have a value of 1, the third node 12c is determined to have a value of 6 and the fourth node 12d is determined to have a value of 3. Since the third node 12c has the highest value, the third node is the only node that transmits during timeslot 3.

In timeslot 4, the first node 12a is determined to have a value of 8, the second node 12b is determined to have a value of 5, the third node 12c is determined to have a value of 2 and the fourth node 12d is determined to have a value of 7. Since the first node 12a has the highest value, the first node is the only node that transmits during timeslot 4.

FIG. 2 includes a table 20 indicating a transmit schedule for the nodes during the four timeslots in the preceding example. The resulting schedule from the election process achieves a collision-free schedule by allowing only one node to transmit (within one- or two-hop neighbors) during each timeslot.

It is therefore desirable in NAMA scheduling for each node to have a consistent view of the network in order to guarantee collision-free schedules. In a dynamic network, a consistency may be achieved by constantly exchanging control information among one-hop neighbors. The control information used in establishing consistency in NAMA scheduling includes at least the node ID of the originator and the node IDs of all the one-hop neighbors of the originator. Upon receiving control information, each node can build up a comprehensive list of neighbors using the node ID of the originator (which becomes one-hop neighbors of the receiver) and node IDs of the one-hop neighbors (which become two-hop neighbors of the receiver).

NAMA scheduling alone does not take in to account bandwidth requirements for each node. In the process described in FIG. 3, each node 12a-12d determines a bandwidth value for each link 14a-14c based on queue size. The bandwidth value is used to bias the fair access technique in favor of those nodes 12a-12d that currently have the most packets to send.

Figure 3:
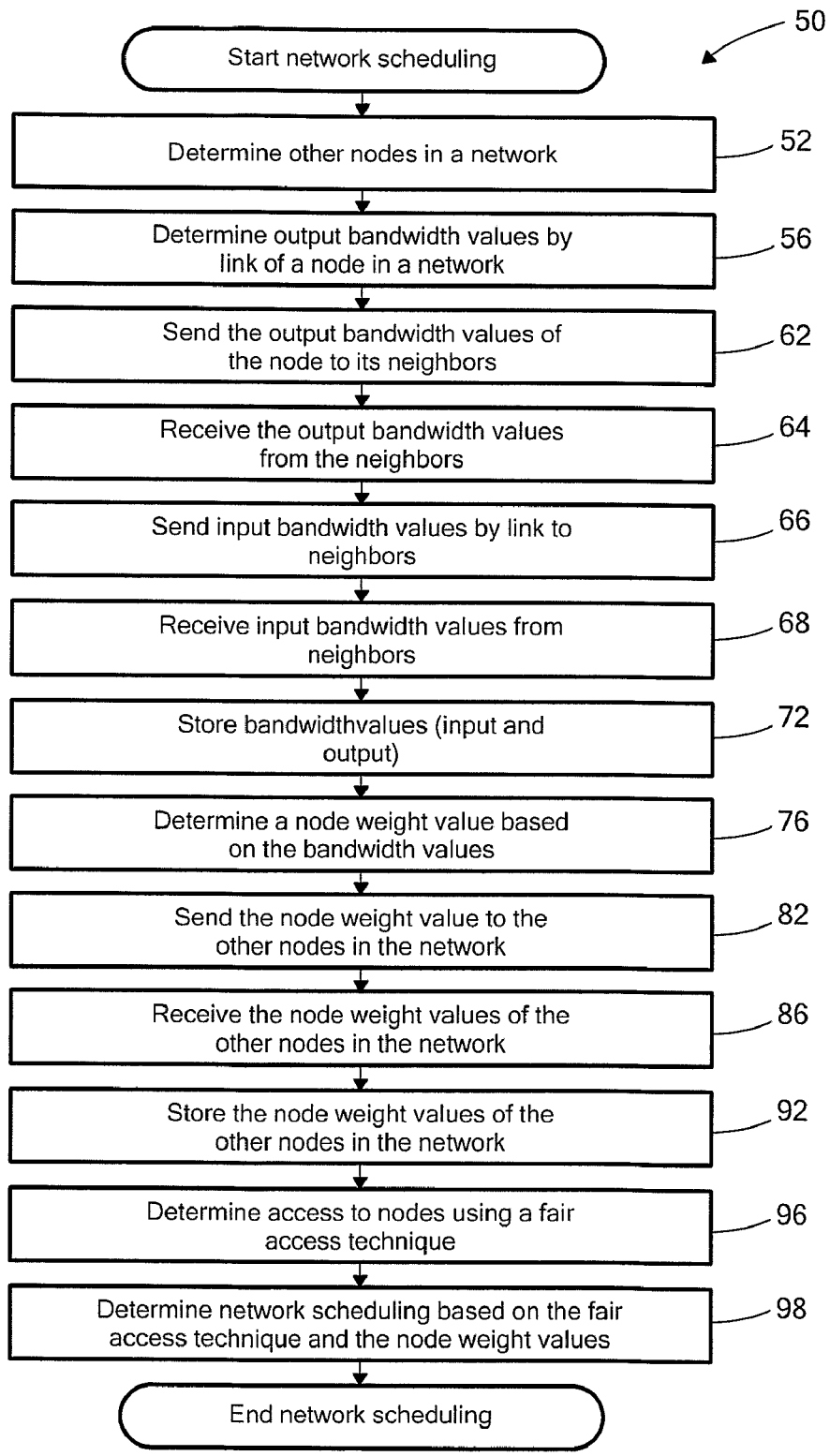
FIG. 3 is a flowchart of an example of a process to schedule network communications using fair access and weighting techniques.

FIG. 3 depicts a flowchart for a process 50 which is an example of a process for network scheduling that includes weighting results of a fair access technique such as NAMA with bandwidth need. Process 50 is performed by each node 12a-12d independently. The nodes 12a-12d determine other nodes in the network (52). For example, during the control timeslots, each node 12a-12d broadcasts its node ID to one-hop neighbors. In this particular example, the node 12a receives a node ID from the node 12b; the node 12b receives node IDS from the nodes 12a, 12c; the node 12c receives node IDs from the nodes 12b, 12d; and the node 12d receives a node ID from the node 12c.

Each node 12a-12d determines its output bandwidth value for each link 14a-14c (56). For example, the node 12a determines an output bandwidth value for link 14a; the node 12b determines output bandwidth values for each of the links 14a, 14b; the node 12c determines output bandwidth values for each of the links 14b, 14c and the node 12d determines an output bandwidth value for the link 14c.

In one example, an output bandwidth value is associated with the number of packets waiting in outbound queues of a node. The output bandwidth value is a number from 1 to 7, for example, representing a sliding scale associated with the number packets. For example, an output bandwidth value of 7 could represent 30 packets in the outbound queues while an output bandwidth value of 3 represents 15 packets in the outbound queues. In one particular example, the bandwidth is determined using pseudocode 100 shown in FIG. 4.

Each node 12a-12d sends its output bandwidth values to its neighbors (62). In one example, the neighbors are one-hop neighbors so that the node 12a sends its output bandwidth value for the link 14a to its one-hop neighbor, node 12b; the node 12b sends its output bandwidth values for the links 14a, 14b to its one-hop neighbors, nodes 12a, 12c respectively; the node 12c sends its output bandwidth values for the links 14b, 14c to its one-hop neighbors, nodes 12b, 12d respectively and the node 12d sends its output bandwidth value for the link 14c to its one-hop neighbor, node 12c.

In one particular example, the node 12a determines an output bandwidth value of 3 for link 14a; the node 12b determines output bandwidth values of 1 and 5 for each of the links 14a, 14b, respectively; the node 12c determines output bandwidth values of 5 and 2 for each of the links 14b, 14c respectively and the node 12d determines an output bandwidth value of 2 for the link 14c. Thus, node 12a sends the output bandwidth value of 3 to the node 12b during a control timeslot; node 12b sends the output bandwidth value of 1 to node 12a during a control timeslot and the output bandwidth value of 5 to the node 12c during a control timeslot; node 12c sends the output bandwidth value of 5 to node 12b during a control timeslot and the output bandwidth value of 2 to the node 12d during a control timeslot; and node 12d sends the output bandwidth value of 2 to the node 12c during a control timeslot. Each node 12a-12d receives output bandwidth values from its neighbors (e.g., one-hop neighbors) (64).

Each node 12a-12d sends input bandwidth values by link to its neighbors (66). An input bandwidth value for a link at a node is an output bandwidth value for the node at the opposite end of the connected link. For example, for the link 14a, if node 12a has an output bandwidth value of 3 then the node 12b has an input bandwidth value having the same value.

In one example, the neighbors are one-hop neighbors so that when executing processing block 66, a node will receive bandwidth values by link for two-hop neighbors from its one-hop neighbors. For example, node 12b shares the input bandwidth value received from node 12c for the link 14b with node 12a, node 12b shares the input bandwidth value received from node 12a for the link 14a with node 12c, node 12c shares the input bandwidth value received from node 12b for the link 14b with the node 12d and the node 12c shares the input bandwidth value received from the node 12d for the link 14c with node 12b.

In one particular example, using the output bandwidth values in the example described for the processing block 64, each of the nodes, during a control timeslot, send its input bandwidth values. For example, the node 12a sends to node 12b its input bandwidth value of 1 for the link 14a; the node 12b sends to both nodes 12a, 12c its input bandwidth value of 3 for the link 14a and its input bandwidth value of 5 for the link 14b; the node 12c sends to both nodes 12b, 12d its input bandwidth value of 5 for the link 14b and its input bandwidth value of 2 for the link 14c; and the node 12d sends to node 12c its input bandwidth value of 2 for link 14c.

Each node 12a-12d receives the input bandwidth values from its neighbors (68) and stores both the input and output bandwidth values (72).

Each node 12a-12d determines its node weight value based on the bandwidth values (76). In one example, the higher the node weight value, the more likely the node will be transmitting and the lower the node weight value, the more likely the node will be receiving.

In one example, each of the nodes 12a-12d, for all of the node's one-hop neighbors, sum their output bandwidth values for each link, Total BW Out, and sum their input bandwidth values for each link, Total BW IN. In one example, a node weight is equal to (Total BW Out)/(Total BW Out+Total BW In).

For example, using the bandwidth values in the preceding examples, the node 12a has a node weight value equal to:

$$(3)/(3+1)=0.75,$$

the node 12b has node weight value equal to:

$$(1+5)/(1+5+3+5)=0.43,$$

the node 12c has a node weight value equal to:

$$(5+2)/(5+2+5+2)=0.50,$$

and the node 12a has a node weight value equal to:

$$(2)/(2+2)=0.50.$$

In other examples, the node weight value may be determined by other means. For example, instead of just using the node weight value as determined in the preceding example, the node weight value may be further processed. In particular, the Total BW out/(Total BW in+total BW out) equals a raw node weight value, RawNodeWt. Using the RawNodeWt, a limited node weight value, LimNodeWt, is determined to limit the node weight value to be between a particular range. For example, LimNodeWt:

$$= 0.25 \quad \text{(if } RawNodeWt < .25\text{)}$$
$$= RawNodeWt$$
$$= 0.9 \quad \text{(if } RawNodeWt > .9\text{)}$$

The LimNodeWt may be further modified in order to fill a particular bit requirement in a control word for transmission to other nodes. In particular, a broadcast node weight value, BroadcastNodeWt, is determined for transmission to the one-hop neighbors of a node. For example, if a control word used in a control timeslot is one byte, eight bits or less may be used to carry the bandwidth value. In one particular example, for a six-bit requirement (i.e., $2^6$=64), the BroadcastNodeWt is equal to CEIL (64*LimNodeWt). A node weight value, NodeWt, used for determining the weighting is equal to BroadcastNodeWt/64.0. Thus, each node receiving the BroadcastNodeWt would divide by 64.0 in order to use the NodeWt for use in weighting.

Each node 12a-12d sends the node weight values to the other nodes in the network (82). In one example, the node weight values are sent to one-hop neighbors. Each of the nodes 12a-12d receives the node weight values of the other nodes (86) and stores the node weight values (92).

Each of the nodes 12a-12d determines access to transmission using a fair access technique the nodes (96). For example, each of the nodes 12a-12d uses a NAMA technique to generate random numbers for nodes based on the node IDs.

Each of the nodes 12a-12d determines network scheduling using the fair access technique and the node weight values (98). For example, using NAMA, the random values generated are weighted by the node weight values.

In one particular example of weighting the random values used in the example for the NAMA technique in FIG. 2, in timeslot 1, the first node 12a is determined to have a value of (4*0.75)=3.00, the second node 12b is determined to have a value of (8*0.43)=3.44, the third node 12c is determined to have a value of (1*0.50)=0.50 and the fourth node 12d is determined to have a value of (7*0.50)=3.50. Since the fourth node 12d has the highest value, the fourth node is the only node that transmits during timeslot 1.

In timeslot 2, the first node 12a is determined to have a value of (3*0.75)=2.25, the second node 12b is determined to have a value of (5*0.43)=2.15, the third node 12c is determined to have a value of (4*0.50)=2.00 and the fourth node 12d is determined to have a value of (9*0.50)=4.50. Since the fourth node 12d has the highest value, the fourth node is the only node that transmits during timeslot 2.

In timeslot 3, the first node 12a is determined to have a value of (2*0.75)=1.50, the second node 12b is determined to have a value of (1*0.43)=0.43, the third node 12c is determined to have a value of (6*0.50)=3.00 and the fourth node 12d is determined to have a value of (3*0.50)=1.50. Since the third node 12c has the highest value, the third node is the only node that transmits during timeslot 3.

In timeslot 4, the first node 12a is determined to have a value of (8*0.75)=6.00, the second node 12b is determined to have a value of (5*0.43)=2.15, the third node 12c is determined to have a value of (2*0.50)=1.00 and the fourth node 12d is determined to have a value of (7*0.50)=3.50. Since the first node 12a has the highest value, the first node is the only node that transmits during timeslot 4.

Figure 5:
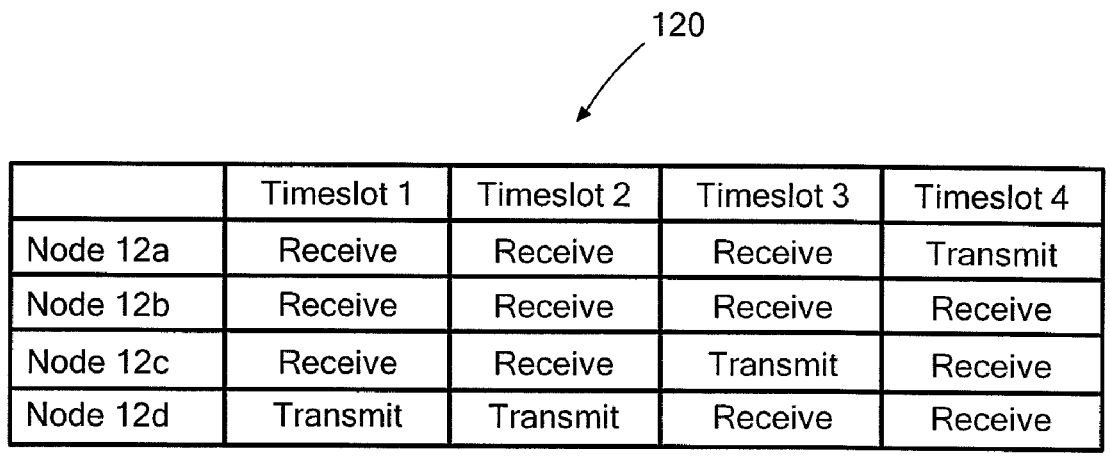
FIG. 5 is a network schedule using the process of FIG. 3.

FIG. 5 includes a table 120 indicating a transmit schedule for the nodes during the four timeslots in the preceding example. The resulting schedule from the election process is weighted by bandwidth need for each timeslot. Rather than the node 12b transmitting in timeslot 1 as shown in FIG. 2, the node 12d transmits in the timeslot 1 because of the node weight value. Thus, the fair access is weighted to bandwidth need.

Since reception of control timeslots in any one-hop neighborhood is not guaranteed, those nodes 12a-12d that do not receive the control timeslots may be using a different set of bandwidth and node weight values compared to those nodes that did receive bandwidth values and node weight values in the control timeslots. Thus, with an inconsistent data for which to base communications, collisions occur. One solution is to add a countdown value associated with each bandwidth value in the control timeslot. For example, if the control timeslot has a 1 byte-word and 6 bits are used for a node weight value, two bits may be used for a countdown value.

In one particular example, each node is synchronized using the Global Positioning System (GPS) so that each node is synchronized every 1 pulse per second (PPS), for example. Since the countdown values need to propagate to two-hop neighbors, the countdown values associated with each item is "2." Each node still computes a bandwidth value for each link; however when a node's link bandwidth value changes (up or down), that node, node X, for example, is not allowed to immediately use the new bandwidth value in network scheduling (e.g., processing block 98 of FIG. 3). Instead, node X sends (using control timeslots) to all its one-hop neighbors the new bandwidth value and sets the countdown value to 2. The old bandwidth value is used in network scheduling by node X during the next second. After the next 1 PPS, Node X sends (using control timeslots) to all of its one-hop neighbors the new bandwidth value and sets the countdown value to 1. The old BW value is used by Node X in network scheduling during the next second. After the next 1 PPS, Node X sends (using control timeslots) to all of its one-hop neighbors the new bandwidth value and sets the countdown value to 0. The new bandwidth value is now used by Node X in network scheduling during the next second. Until the bandwidth value needs to be changed, all future control timeslots will have the new bandwidth value and will keep the countdown value at 0. In one example, a countdown value of 0 indicates a given bandwidth value is being used. In one example, the countdown value does not drop below zero and once a countdown has started, it continues to zero. In other examples, a countdown value may be replace by a counter that increments rather than decrements to a predetermined value. In other examples, whether the counter increments or decrements, the final value may be any predetermined value.

Figure 6:
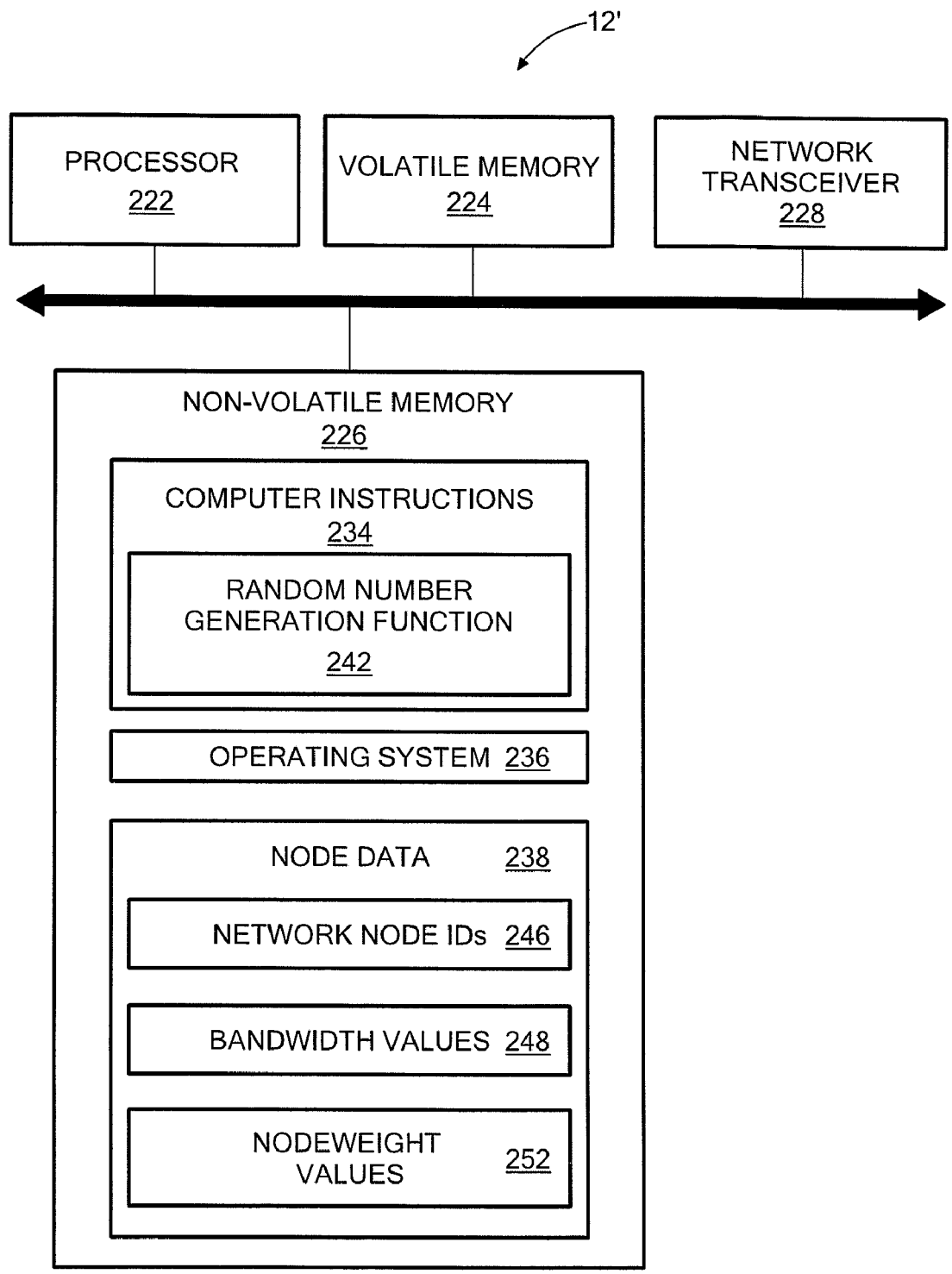
FIG. 6 is a block diagram of an example of a network node on which the process of FIG. 3 may be implemented.

Referring to FIG. 6, one or more of the nodes 12a-12d may be configured as a network node 12', for example. The network node 12' includes a processor 222, a volatile memory 224, a non-volatile memory 226 (e.g., hard disk) and a network transceiver 228. The non-volatile memory 226 stores computer instructions 234, an operating system 236 and node data 238. The computer instructions 234 include a random number generation function 242, for example, for use with NAMA. The node data 238 includes network nodes IDs 246, bandwidth values 248 and node weight values 252. In one example, the node data 238 is stored in a list (not shown). In another example, the node data 238 is stored in tables (not shown). The transceiver 228 is used to communicate with the other network nodes. In one example, the computer instructions 234 are executed by the processor 222 out of volatile memory 224 to perform process 50.

The process 50 is not limited to use with the hardware and software of FIG. 6; it may find applicability in any computing or processing environment and with any type of machine or set of machines that is capable of running a computer program. Process 50 may be implemented in hardware, software, or a combination of the two. Process 50 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

The processes described herein are not limited to the specific embodiments described herein. For example, process 50 is not limited to the specific processing order of FIG. 3. Rather, any of the processing blocks of FIG. 3 may be re-ordered, combined or removed, performed in parallel or in serial, as necessary, to achieve the results set forth above.

The processing blocks in FIG. 3 associated with implementing the process 50 may be performed by one or more programmable processors executing one or more computer programs to perform the functions of the system. All or part of the process 50 may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method to schedule network communications in a network having nodes connected by links comprising:
   sending a bandwidth value of a first node for each link connected to the first node to neighbors of the first node, the bandwidth value associated with a number of packets in one or more outbound queues of the first node;
   receiving bandwidth values from the neighbors of the first node;
   determining a node weight value of the first node based on a ratio of the bandwidth value of the first node to the bandwidth values from the neighbors of the first node;
   sending the node weight value of the first node to the neighbors of the first node;
   receiving node weight values from the neighbors of the first node;
   determining access values for each node based on a fair access technique; and
   determining a network scheduling for one or more of the first node and the neighbors of the first node based on the access values biased according to the node weight value of the first node and the node weight values from the neighbors of the first node.

2. The method of claim 1 wherein sending a bandwidth value of a first node for each link connected to the first node to neighbors of the first node comprises sending a bandwidth value of a first node for each link connected to the first node to one-hop neighbors of the first node.

3. The method of claim 2 wherein receiving bandwidth values from the neighbors comprises receiving bandwidth values for two-hop neighbors of the first node from the one-hop neighbors.

4. The method of claim 1 wherein determining access values for each node based on a fair access technique comprises determining random values for each two-hop neighbor of the first node using a Node Activation Multiple Access (NAMA) technique.

5. The method of claim 1 wherein sending a bandwidth value of a first node for each link connected to the first node to neighbors of the first node comprises sending a bandwidth value of a first node during a control timeslot.

6. The method of claim 5, further comprising sending a counter value with the bandwidth value during the control timeslot.

7. The method of claim 6, further comprising using the bandwidth value for network scheduling when the counter value is equal to a predetermined value.

8. An apparatus to schedule communications in a network having nodes connected by links, comprising circuitry to:
    send a bandwidth value of a first node for each link connected to the first node to neighbors of the first node, the bandwidth value associated with a number of packets in one or more outbound queues of the first node;
    receive bandwidth values from the neighbors of the first node;
    determine a node weight value of the first node based on a ratio of the bandwidth value of the first node to the bandwidth values from the neighbors of the first node;
    send the node weight value of the first node to the neighbors of the first node;
    receive node weight values from the neighbors of the first node;
    determine access values for each node based on a fair access technique; and
    determine a network scheduling for one or more of the first node and the neighbors of the first node based on the access values biased according to the node weight value of the first node and the node weight values from the neighbors of the first node.

9. The apparatus of claim 8 wherein the circuitry comprises at least one of a processor, a memory, programmable logic and logic gates.

10. The apparatus of claim 8 wherein circuitry to send a bandwidth value of a first node for each link connected to the first node to neighbors of the first node comprises circuitry to send a bandwidth value of a first node for each link connected to the first node to one-hop neighbors of the first node.

11. The apparatus of claim 10 wherein circuitry to receive bandwidth values from the neighbors comprises circuitry to receive bandwidth values for two-hop neighbors of the first node from the one-hop neighbors.

12. The apparatus of claim 8 wherein circuitry to determine access values for each node based on a fair access technique comprises circuitry to determine random values for each two-hop neighbor of the first node using a Node Activation Multiple Access (NAMA) technique.

13. The apparatus of claim 8 wherein circuitry to send a bandwidth value of a first node for each link connected to the first node to neighbors of the first node comprises circuitry to send a bandwidth value of a first node during a control timeslot.

14. The apparatus of claim 13, further comprising circuitry to send a counter value with the bandwidth value during the control timeslot.

15. The apparatus of claim 14, further comprising circuitry to use the bandwidth value for network scheduling when the counter value is equal to a predetermined value.

16. An article comprising a non-transitory machine-readable medium that stores executable instructions to schedule communications in a network having nodes connected by links, the instructions causing a machine to:
    send a bandwidth value of a first node for each link connected to the first node to neighbors of the first node, the bandwidth value associated with a number of packets in one or more outbound queues of the first node;
    receive bandwidth values from the neighbors of the first node;
    determine a node weight value of the first node based on a ratio of the bandwidth value of the first node to the bandwidth values from the neighbors of the first node;
    send the node weight value of the first node to the neighbors of the first node;
    receive node weight values from the neighbors of the first node;
    determine access values for each node based on a fair access technique; and
    determine a network scheduling for one or more of the first node and the neighbors of the first node based on the access values and biased according to the node weight value of the first node and the node weight values from the neighbors of the first node.

17. The article of claim 16 wherein instructions causing a machine to send a bandwidth value of a first node for each link connected to the first node to neighbors of the first node comprises instructions causing a machine to send a bandwidth value of a first node for each link connected to the first node to one-hop neighbors of the first node.

18. The article of claim 17 wherein instructions causing a machine to receive bandwidth values from the neighbors comprises instructions causing a machine to receive bandwidth values for two-hop neighbors of the first node from the one-hop neighbors.

19. The article of claim 16 wherein instructions causing a machine to determine access values for each node based on a fair access technique comprises instructions causing a machine to determine random values for each two-hop neighbor of the first node using a Node Activation Multiple Access (NAMA) technique.

20. The article of claim 16 wherein instructions causing a machine to send a bandwidth value of a first node for each link connected to the first node to neighbors of the first node comprises instructions causing a machine to send a bandwidth value of a first node during a control timeslot.

21. The article of claim 20, further comprising instructions causing a machine to send a counter value with the bandwidth value during the control timeslot.

22. The article of claim 21, further comprising instructions causing a machine to use the bandwidth value for network scheduling when the counter value is equal to a predetermined value.

* * * * *

UNITED STATES PATENT AND TRADEMARK OFFICE
CERTIFICATE OF CORRECTION

PATENT NO. : 7,801,153 B2
APPLICATION NO. : 11/947928
DATED : September 21, 2010
INVENTOR(S) : Arthur E. Anderson et al.

It is certified that error appears in the above-identified patent and that said Letters Patent is hereby corrected as shown below:

Claim 16, Line 22, "access values and biased according to the node weight" should read -- access values biased according to the node weight --

Signed and Sealed this
Fourth Day of January, 2011

David J. Kappos
*Director of the United States Patent and Trademark Office*

UNITED STATES PATENT AND TRADEMARK OFFICE
CERTIFICATE OF CORRECTION

PATENT NO. : 7,801,153 B2  Page 1 of 1
APPLICATION NO. : 11/947928
DATED : September 21, 2010
INVENTOR(S) : Arthur E. Anderson et al.

It is certified that error appears in the above-identified patent and that said Letters Patent is hereby corrected as shown below:

Column 10, line 31 (Claim 16, Line 22) "access values and biased according to the node weight" should read -- access values biased according to the node weight --

This certificate supersedes the Certificate of Correction issued January 4, 2011.

Signed and Sealed this
First Day of February, 2011

David J. Kappos
*Director of the United States Patent and Trademark Office*